May 31, 1955
J. R. LUSE
2,709,265
BEEHIVES
Filed Oct. 2, 1952
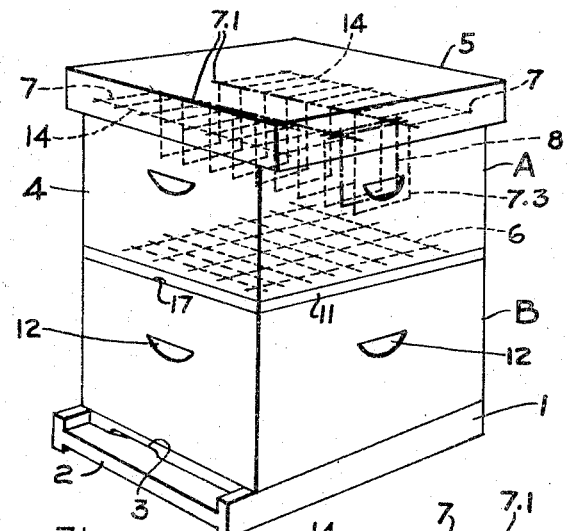
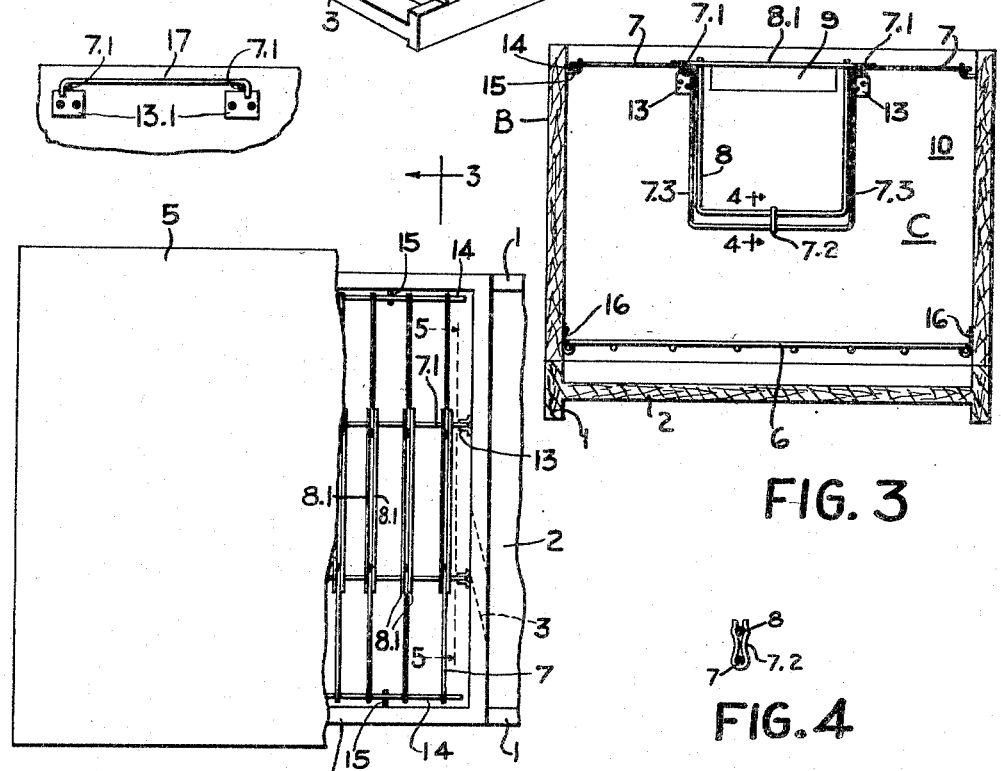
Joseph R. Luse INVENTOR
BY Busle & Bush ATTORNEYS United States Patent Office 2,709,265
Patented May 31, 1955

2,709,265

BEEHIVES

Joseph R. Luse, Centerville, Iowa

Application October 2, 1952, Serial No. 312,826

5 Claims. (Cl. 6—2)

My invention relates to an improvement in beehives.

The objects of my invention are to provide light metallic frames and honey boxes as a substitute for the wooden frames and wooden honey boxes heretofore in common use; to provide one or more hive sections each having an assembly of long metal frames (for convenience referred to as the "brood frames"), provided with rectangular metal receptacles (for convenience referred to as the "honey boxes"), removably mounted in the mid-sections of the brood frames; to provide means by which any of the honey boxes can be removed from adjacent brood frames for inspection or other purposes; to provide a plurality of rectangular metal honey boxes with the usual wax foundation secured therein and any one of which boxes can be removed from the hive singly if desired.

I attain these objects by the means shown in the accompanying drawings, in which—

Figure 1 is a perspective view showing two units or sections with base and cover and showing interior parts of section A in dotted lines;

Figure 2 is a fractional top view of section B;

Figure 3 is a section on the line 3—3 of Figure 2;

Figure 4 is an enlarged sectional detail on the line 4—4 of Figure 3;

Figure 5 is a fractional detail of an alternate form showing a bar for retaining the middle horizontal rods.

Similar numerals refer to similar parts throughout the several views.

My improvement is applicable to hives having one or more sections of either wood or metal with vertical sides and ends and bottom boards 2 and covers 5 and may have intermediate boards above the frames.

The lower section B is supported by a suitable base 1. The bottom board 2 carries a cleat at the front of the hive with a slot or groove 3 formed therein to afford a passageway in and out for the bees.

Near the top of each section brackets 13 are rigidly mounted on the sides thereof and carry a pair of transverse horizontal rods 7.1 spaced apart near the middle thereof. Similar rods 14 are mounted upon brackets 15 secured on the end walls. Resting upon the rods 7.1 and 14 and spaced apart are longitudinal brood frames including a plurality of long wires or rods 7 the middle portions or mid-sections of which are turned downwardly and bent into three sides of squares 7.3 as shown in Figure 3, which extend downwardly from the horizontal parts of said rods 7.

The horizontal upper portions of the wires 7 rest upon the transverse rods 7.1 and 14 and may be united thereto by welding or other suitable means if desired.

Within the squares 7.3 of the wires 7, I mount inner square metal frames 8, preferably of wires or small rods, and for convenience these square frames are referred to as "boxes" or "honey boxes." Each box includes a single rod or wire bent to form the bottom and sides of the box and with two top wires or small rods 8.1 united to the top of the side wires. The wires or rods 8.1 rest by gravity upon rods 7.1 and are not united thereto, but are removable with the boxes of which they form a part.

The lower parts of the rods or wires 7 and 8 are secured in close relation by wire clips 7.2 which may be welded to the wires 7.

In the use of my improvement, I prefer to have mounted in each of the boxes 8 a wax foundation 9 secured to the top rods or wires 8.1.

Grooves 12 for handholds may be formed in the sides or ends of the sections of the hive to facilitate moving.

When a swarm of bees is placed in a single section of such a hive, they will build their combs separately upon and downward from the wax foundations in either the honey boxes or the brood frames and fill them with honey spacing the combs apart and the combs may extend down to the wire screen 6 near the bottom board.

When a single section hive has been filled, the filled section may be raised to an upper position as section A and a lower empty section B placed thereunder. Such lower section may be arranged to carry a queen bee and brood cells which may be taken out of the upper section A and placed in a central position in the lower section B. The queen bee will act in laying eggs, in her treatment of the drones and otherwise in the usual manner of such bees and when the drones become too numerous, some of them will be disposed of by the other bees.

In Figure 3 the letter C marks one closed side of the section B. In Figure 5 numerals 13.1 indicate brackets corresponding to the numerals 13 in Figure 3 and the rod 17 indicates a retaining bar with its ends turned downwardly arranged to embrace and act as a clamp to prevent lateral spreading of the bars 7.1.

Any number of boxes may be moved from the upper to an adjoining lower section or any number of these boxes may be taken out and the honey extracted therefrom without removing the long frames.

Any unit or section of the housings of the hive with its entire assembly of long frames and boxes therein, may be removed and placed in an extractor for extraction of the wax and honey therefrom by the application of heat.

My arrangement will also permit the transfer of frames carrying a queen and other bees to form a new colony when desired.

Various modifications may be made in the size, material and relative positions of the parts without departing from the spirit of my invention as expressed in the claims and I do not limit my claims to the precise forms shown in the drawings.

I claim:

1. In a rectangular beehive, an interior metal frame assembly including a plurality of spaced supporting bars removably mounted in and near the top of the hive, a plurality of long spaced brood frames carried by the supporting bars at right angles thereto each of the brood frames having a downwardly extending rectangular midsection adapted to contain a square metal box removably mounted therein.

2. In a beehive, a plurality of brood frames as described in claim 1, and a corresponding plurality of metal honey boxes removably mounted in and carried by the brood frames respectively.

3. In a beehive, a frame assembly as described in claim 2, each of the honey boxes being removable either separately or the entire assembly of honey boxes being removable simultaneously.

4. In a beehive, a frame assembly as described in claim 3, each rectangular metal honey box including a pair of horizontal rods at the top thereof united to the upper ends of the downwardly extending portions thereof.

5. A beehive having an assembly of brood frame and honey boxes mounted therein as described in claim 4, and a screen of closely spaced wires mounted in the hive below the brood frames and spaced therefrom parallel to the bottom board of the hive.

References Cited in the file of this patent

UNITED STATES PATENTS

| | | |
|---|---|---|
| 154,874 | Leedy | Sept. 8, 1874 |
| 327,716 | Pearson | Oct. 6, 1885 |
| 1,117,180 | Gamallo | Nov. 17, 1914 |
| 1,203,675 | Wood | Nov. 7, 1916 |
| 1,247,607 | Akashi | Nov. 27, 1917 |
| 1,441,524 | Platten | Jan. 9, 1923 |
| 2,103,066 | Engelbrektsson | Dec. 21, 1937 |
| 2,146,844 | Panei | Feb. 14, 1939 |